Nov. 16, 1937.  B. C. EBERHARD  2,099,514
PUNCTURE SEALING INNER TUBE FOR PNEUMATIC TIRES
Filed April 13, 1935
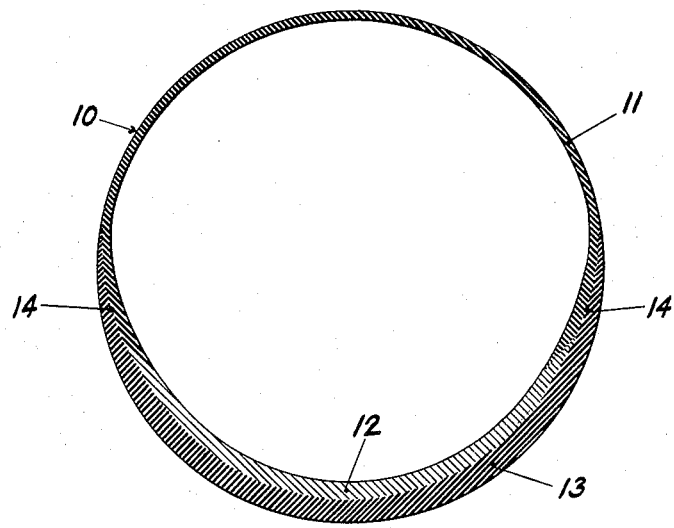
Fig. 1.
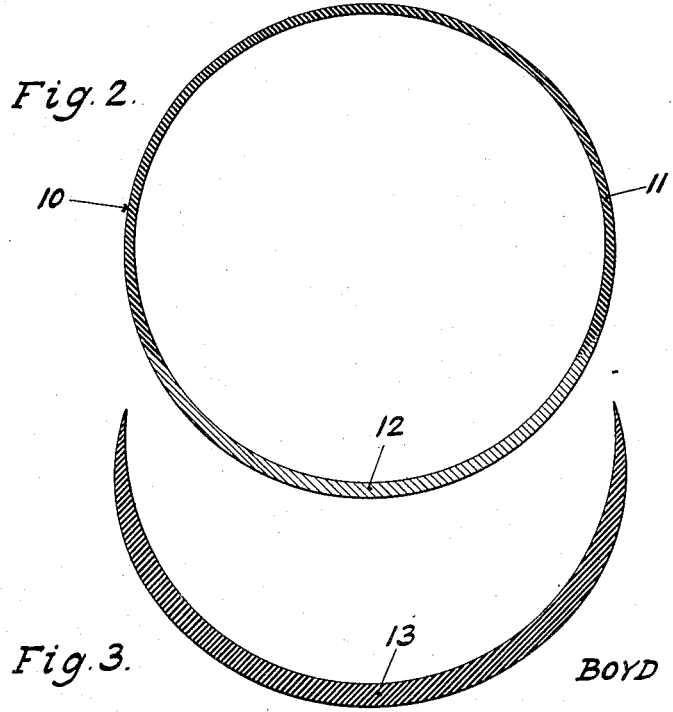
Fig. 2.
Fig. 3.
Inventor
BOYD C. EBERHARD
By
Attorney Patented Nov. 16, 1937

2,099,514

UNITED STATES PATENT OFFICE 2,099,514

PUNCTURE-SEALING INNER TUBE FOR PNEUMATIC TIRES

Boyd C. Eberhard, Akron, Ohio, assignor to Wingfoot Corporation, Wilmington, Del., a corporation of Delaware Application April 13, 1935, Serial No. 16,193

7 Claims. (Cl. 154—14)

The present invention relates to inner tubes for pneumatic tires and it has particular relation to inner tubes of the puncture-sealing type.

One of the objects of the present invention is to provide an inner tube having a body portion initially formed with a rim-adjacent portion of vulcanized rubber and an integral tread-adjacent portion of unvulcanized rubber, and having an outer tread portion of heat-resisting rubber vulcanized or otherwise secured both to the non-vulcanizable tread-adjacent portion of the body and to the rim-adjacent portion thereof, such non-vulcanizable rubber providing a plastic inner lining for the tube which is adapted to flow into and seal punctures developing in the outer tread portion.

Another object of the invention is to provide a method of fabricating an inner tube of the character described which includes the steps of forming, preferably by extrusion, tube stock having a rim-adjacent portion of vulcanizable rubber and an integral tread-adjacent portion of relatively plastic non-vulcanizable rubber, severing the stock into sections of the desired length and vulcanizing an outer tread portion of relatively tough heat-resisting vulcanizable rubber over the tread-adjacent portion of plastic rubber.

With such objects in view, as well as other advantages which may be incident to the use of the improvements, the invention consists in the parts and combinations thereof hereinafter set forth and claimed, with the understanding that the several necessary elements constituting the same may be varied in proportions and arrangements without departing from the nature and scope of the invention as defined in the appended claims.

In order to make the invention more clearly understood there are shown in the accompanying drawing, means for carrying the invention into practical effect, without limiting the improvements in their useful application to the particular constructions and arrangements which, for the purpose of explanation, have been made the subject of illustration.

In the accompanying drawing:

Fig. 1 is a vertical transverse sectional view through an inner tube constructed in accordance with the invention;

Fig. 2 is a similar view through the body portion of the tube prior to the application of the tread portion thereto; and Fig. 3 is a transverse sectional view through the tread portion of the tube prior to its application to the body portion thereof.

Referring to the drawing, an inner tube constructed in accordance with the invention is shown as comprising a body portion 10 embodying a rim-adjacent portion 11 of vulcanizable rubber, having relatively high rust- and dirt-resisting qualities, and a tread-adjacent portion 12 of plastic material, such as non-vulcanizable rubber, formed integrally therewith. Suitably bonded to the tread-adjacent portion 12 of the tube body 10, such as by vulcanizing, is an outer tread portion 13 of relatively tough heat-resisting rubber which overlaps the portion 11 of the body 10, as indicated at 14. The portion 12 of the body 10, in effect, forms a relatively plastic inner lining for the tube, such as will flow into and seal any punctures developing in the outer tread portion 13.

In fabricating the above-described tube, the tube stock from which the body 10 is formed is preferably extruded by a machine such as that described in U. S. Patent to W. C. State et al. No. 1,934,647 dated November 7, 1933. In this patent different rubber stocks are extruded through an annular orifice to form a tube having for example, a rim portion of black rubber and a tread portion of red rubber integrally united at diametrically disposed points. In the present instance, the vulcanizable rubber forming the rim-adjacent portion of the tube is fed to one side of the machine and the plastic material, such as non-vulcanizable rubber is fed to the other side of the machine so that these materials will issue from the orifice integrally united in the shape and manner described. This tube stock is then cut into sections of the desired length and slipped over a circular split mandrel where, after being secured in position, it is smoothed and the surface of the tread-adjacent portion 12 of non-vulcanizable rubber is cleaned and rendered tacky by the application of a rubber solvent, such as benzine. The tread portion 13 of vulcanizable rubber is then superimposed thereupon and is pressed into intimate contact with the portion 12 of the body 10 by means of a roller having a concave circumference conforming substantially to the radius of curvature of the finished tube. As soon as a proper union between the tread 13 and non-vulcanizable rubber 12 is effected, the tube section is removed from the mandrel, its ends trimmed to length, and skived, and then joined together in a manner well known in the art. The tube is then placed in a vulcanizing mold and subjected to heat and internal air pressure for a period of time sufficient to effect a thorough curing of the vulcanizable rubber portions. During this operation the rubber of the tread 13 becomes vulcanized to that of the portion 12 due to, what may be termed, the migration of sulphur from the former to the latter, if the same is non-vulcanizable rubber, but this migration is sufficient only to effect a surface union without altering its plastic characteristics. After removal from the vulcanizing mold the tube is finished in the well-known manner.

From the foregoing it will be apparent that a very efficient and long-lived tube is provided and one in which punctures of considerable size will become sealed before the air pressure is reduced any appreciable amount.

While the inner lining 12 is described as being composed of rubber, it will be obvious that other suitable plastic materials may be utilized for the described purpose. In the event that the material of the portion 12 is one with which a vulcanized union with the tread portion 13 cannot be effected, these portions may be bonded together by cement, for example. It will be noted that the tread portion 12 overlaps and is vulcanized to the rim-adjacent portion 11 for a substantial distance and forms in effect a continuation thereof. This will permit the use of a material other than rubber for the inner lining providing that such material will retain its form long enough to permit the application and vulcanization of the tread portion 13.

Other modifications and changes in proportion and arrangement of the several necessary elements constituting the invention may be made by those skilled in the art without departing from the nature and scope of the invention as defined in the appended claims.

Having thus described the invention, what I claim is:

1. A method of making inner tubes for pneumatic tires, which comprises forming tube stock having a rim-adjacent portion of vulcanizable rubber and a tread-adjacent portion of plastic material formed integrally therewith, severing a section of predetermined length from said tube stock, applying an outer tread portion of vulcanizable rubber to the tread-adjacent portion of said section, connecting the ends of said section to form an endless tube, and permanently uniting said portions and said ends to form an integral structure, said plastic material forming an inner lining for said tube adapted to flow into and seal punctures developing in said outer tread portion.

2. A method of making inner tubes for pneumatic tires, which comprises forming tube stock having a rim-adjacent portion of vulcanizable rubber and a tread-adjacent portion of plastic rubber formed integrally therewith, severing a section of predetermined length from said tube stock, applying an outer tread portion of vulcanizable rubber to the tread-adjacent portion of said section, connecting the ends of said section to form an endless tube, and permanently uniting said portions and said ends to form an integral structure, said plastic rubber forming an inner lining for said tube adapted to flow into and seal punctures developing in said outer tread portion.

3. A method of making inner tubes for pneumatic tires, which comprises extruding tube stock having a rim-adjacent portion of vulcanizable rubber and a tread-adjacent portion of non-vulcanizable plastic material formed integrally therewith, severing a section of predetermined length from said tube stock, applying an outer tread portion of vulcanizable rubber to the tread-adjacent portion of said section, connecting the ends of said section to form an endless tube, and permanently uniting said portions and said ends to form an integral structure, said plastic material forming an inner lining for said tube adapted to flow into and seal punctures developing in said outer tread portion.

4. A method of making inner tubes for pneumatic tires, which comprises extruding tube stock having a rim-adjacent portion of vulcanizable rubber and a tread-adjacent portion of non-vulcanizable rubber formed integrally therewith, severing a section of predetermined length from said tube stock, applying an outer tread portion of vulcanizable rubber to the tread-adjacent portion of said section, connecting the ends of said section to form an endless tube, and permanently uniting said portions and said ends to form an integral structure, said non-vulcanizable rubber forming an inner lining for said tube adapted to flow into and seal punctures developing in said outer tread portion.

5. A method of making inner tubes for pneumatic tires which comprises extruding tube stock having a rim-adjacent portion of vulcanizable rubber and a tread-adjacent portion of non-vulcanizable plastic rubber formed integrally therewith, severing a section of predetermined length from said tube stock, applying an outer tread portion of vulcanizable rubber to the tread-adjacent portion of said section, connecting the ends of said section to form an endless tube, and permanently uniting said portions and said ends by vulcanizing to form an integral structure, said plastic rubber forming an inner lining for said tube adapted to flow into and seal punctures developing in said outer tread portion.

6. The method of making inner tubes for pneumatic tires which comprises forming a section of tube stock with a rim-adjacent portion of vulcanizable rubber and a tread-adjacent portion of plastic material formed integrally therewith, applying an outer tread portion of vulcanizable rubber to the tread-adjacent portion of said section and permanently uniting the same and forming said tube stock into an endless tube, said plastic material forming an inner lining for said tube adapted to flow in and seal punctures developed in said outer tread portion.

7. The method of making puncture-seal inner tubes which comprises simultaneously extruding portions of plastic unvulcanizable rubber and plastic vulcanizable rubber, joining the edges thereof to form a tube with a rim-adjacent portion of vulcanizable rubber and a tread-adjacent portion of unvulcanizable rubber and applying an outer tread portion over said tread-adjacent portion to completely cover the same, and permanently uniting the portions.

BOYD C. EBERHARD.